United States Patent
Karidis et al.

(10) Patent No.: US 6,307,741 B1
(45) Date of Patent: Oct. 23, 2001

(54) SYSTEM AND METHOD FOR IMPROVING THE PHYSICAL MANAGEMENT OF A PORTFOLIO COMPUTER AND REDUCING THE FOOTPRINT THEREOF DURING OPERATION

(75) Inventors: John P. Karidis, Ossining, NY (US); Ronald Alan Smith, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/504,644

(22) Filed: Feb. 16, 2000

(51) Int. Cl.$^7$ ....................................... H05K 5/00
(52) U.S. Cl. ............................. 361/683; 361/683
(58) Field of Search ................. 281/29, 31; 402/70, 402/73; 361/683

(56) References Cited

U.S. PATENT DOCUMENTS

| | | | |
|---|---|---|---|
| 4,848,798 | * 7/1989 | Moor | 281/31 |
| 5,049,862 | 9/1991 | Dao et al. | |
| 5,105,338 | * 4/1992 | Held | 361/391 |
| 5,295,089 | 3/1994 | Ambasz | |
| 5,933,320 | 8/1999 | Malhi | |

* cited by examiner

Primary Examiner—Leo P. Picard
(74) Attorney, Agent, or Firm—John B. Schelkopf; Andrew Dillon (57) ABSTRACT

A portfolio computer notebook has outer hardback covers with a flexible spine. A portfolio computer is mounted to the inner surface of one of the covers, and a paper notepad is mounted to the inner surface of the other cover. Each hardback cover has a fold line that bisects it into two panels. The fold lines allow the "footprint" of the open portfolio to be reduced by approximately half of the area required by conventional portfolios without having to bend the cover back over on itself. The footprint is reducible regardless of which component the user wishes to utilize. For example, to use the computer, the user creases the hardback cover of the computer at its fold line such that half of the cover rotates and the other half of the cover stays parallel to the notepad. The computer remains mounted to the parallel half. As the computer and parallel half of the cover are moved over the top of the notepad, the two halves of the computer cover form a z-like configuration with the notepad cover. The footprint reduction is complete when the computer sits on top of the notepad and both halves of the computer cover are parallel to the notepad cover.

15 Claims, 10 Drawing Sheets

SYSTEM AND METHOD FOR IMPROVING THE PHYSICAL MANAGEMENT OF A PORTFOLIO COMPUTER AND REDUCING THE FOOTPRINT THEREOF DURING OPERATION

BACKGROUND OF THE INVENTION

1. Technical Field

This invention relates in general to an improved portfolio computer and in particular to improving the ability of users to physically manage portfolio computers. Still more particularly, the invention relates to a system and method for improving the physical management of a portfolio computer while reducing the footprint of the portfolio computer during operation.

2. Description of the Prior Art

A portfolio computer is a relatively small, notebook-type computer that is contained within a portfolio notebook cover. The cover has a pair of flat, symmetric, hardback halves or portions that are joined by a flexible hinge along adjacent side edges (see, e.g., FIG. 3). The portfolio computer is typically mounted to the interior surface of one of the portions of the cover and usually includes an integrated, low profile keyboard with a movable display screen. Optionally, the display is touch-screen enabled. A paper notepad, digitizer, etc., is mounted to the interior surface of the opposite portion of the cover.

Figure 4:
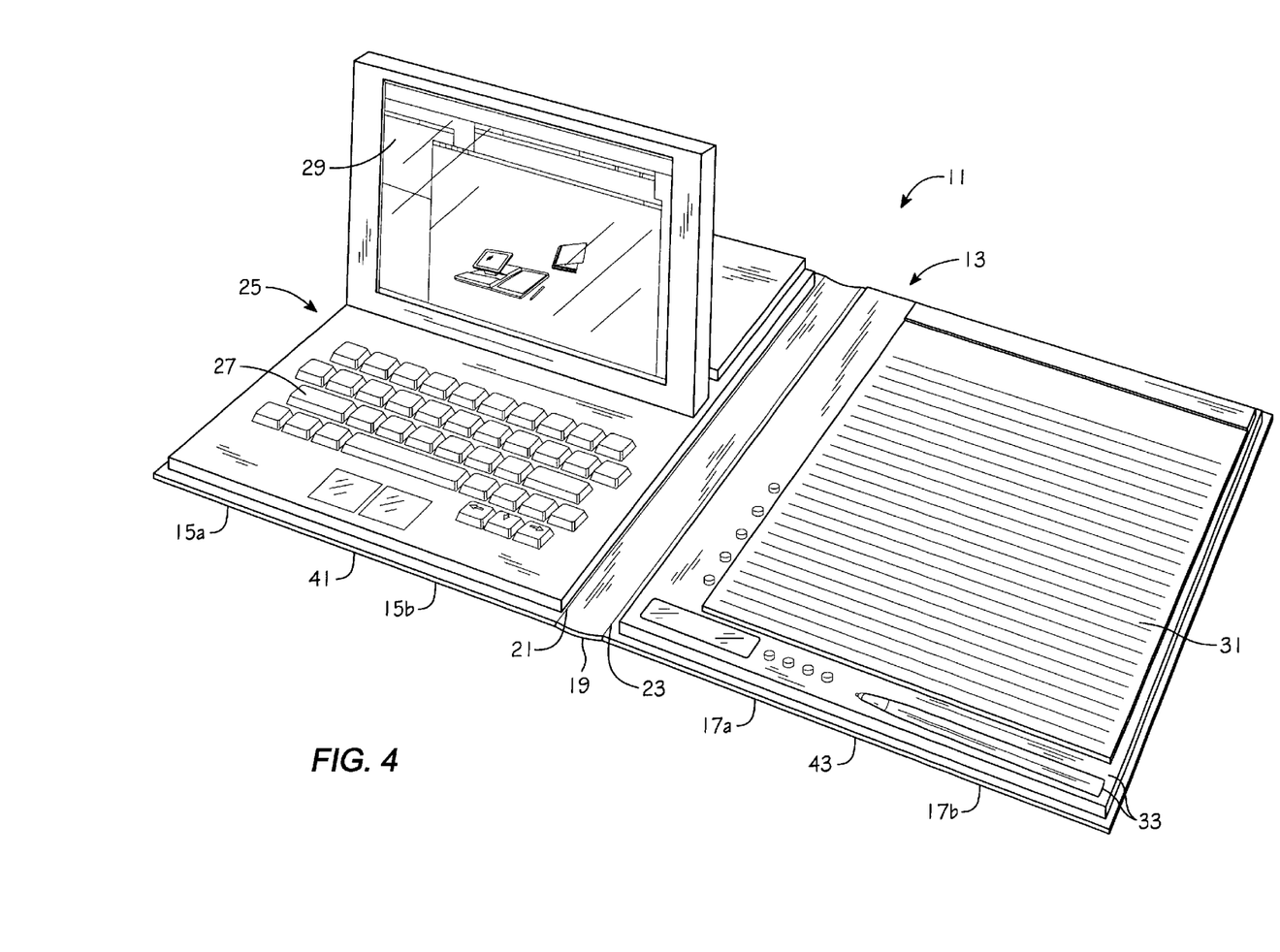
FIG. 4 is an isometric top view of the portfolio notebook computer of FIG. 1 with the notebook in the open position and the display screen elevated.

When the cover is in the closed position (see, e.g., FIGS. 1 and 2), the portfolio has a generally flat rectangular shape or "footprint" that consumes an area measuring approximately 10×13 inches. Neither the portfolio computer nor the notepad are accessible when the cover is closed. The cover is moved to the open position by pivoting one of the portions 180° relative to the other, thereby doubling the footprint of the portfolio. In the open position, both the notepad and computer are accessible and the display screen may be articulated to an upright position for easier viewing by the user (see, e.g., FIG. 4).

Under normal operating circumstances, the user is seated and has a supportive working surface with ample room to utilize the portfolio with the cover in the open position. However, if the user is standing while using the portfolio, or is utilizing the portfolio in a limited space as(such as an airplane seat), the portfolio may become unwieldy or exceed the size of the space available. Under such circumstances, the user typically desires to minimize the footprint or space consumed by the portfolio.

Until now, the only way to reduce the footprint of the portfolio was to fold the cover back over on itself (i.e., rotating one of the portions a full 360° relative to the other). Unfortunately, this common solution to the problem causes either the portfolio computer or the notepad to be completely exposed on the bottom of the folded-over cover, thereby increasing their risk of damage. Moreover, because the display screen and the pages of the notepad are movable, they will tend to flop outward or hang downward from the cover unless additional support is provided. Thus, a need exists to provide improved physical management of portfolio computers and to selectively reduce their operational footprints.

SUMMARY OF THE INVENTION

A portfolio computer notebook or "portfolio" has outer hardback covers with a flexible spine that give it a large book-like appearance. A portfolio computer is mounted to the inner surface of one of the covers, and a paper notepad is mounted to the inner surface of the other cover. Each hardback cover has a fold line that bisects it into two panels. The fold lines allow the "footprint" of the open portfolio to be reduced by approximately half of the area required by conventional portfolios without having to bend one cover all the way back against the other cover. The footprint is reducible regardless of which component the user wishes to utilize.

For example, to use the computer, the user creases its hardback cover at its fold line such that half of the cover rotates and the other half of the cover stays parallel to the notepad. The computer remains mounted to the parallel half. As the computer and the parallel half of the cover are moved over the top of the notepad, the two halves of the computer cover form a z-like configuration with the notepad cover. The footprint reduction is complete when the computer sits on top of the notepad and both halves of the computer cover are parallel to the notepad cover.

Accordingly, it is an object of the present invention to provide an improved portfolio computer.

It is an additional object of the present invention to improve the ability of users to physically manage portfolio computers.

Still another object of the present invention is to provide a system and method for improving the physical management of a portfolio computer while reducing the footprint of the portfolio computer during operation.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
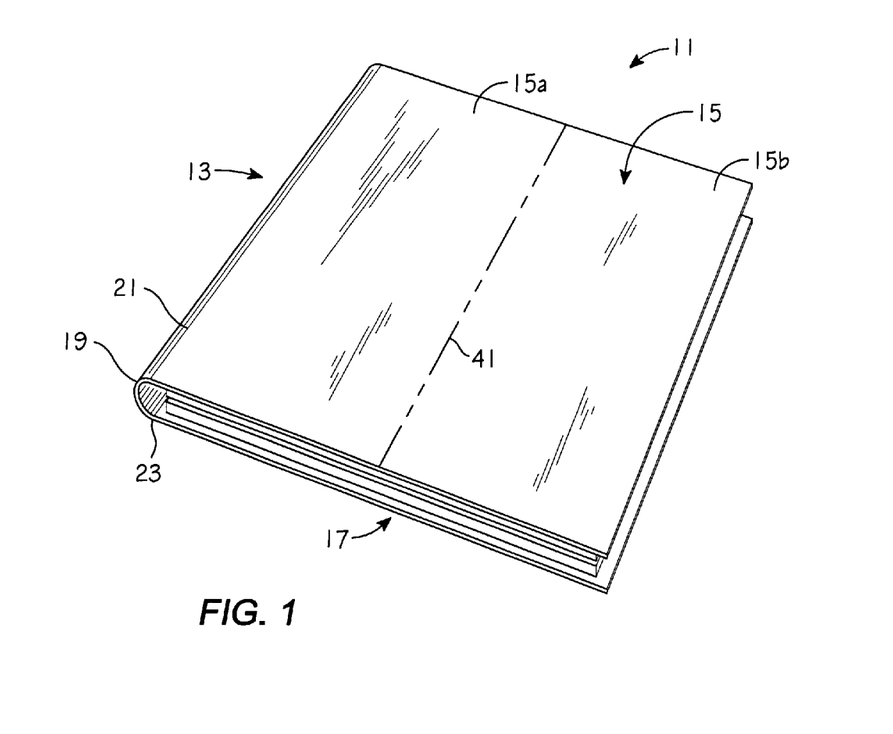
FIG. 1 is an isometric top view of a portfolio notebook computer constructed in accordance with the invention and shown with the notebook in a closed position.
Figure 2:
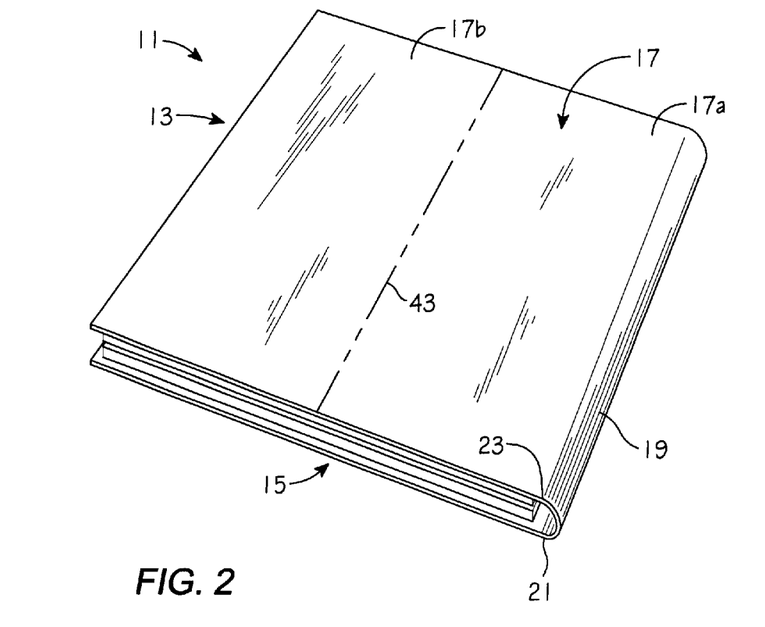
FIG. 2 is an isometric bottom view of the portfolio notebook computer of FIG. 1 with the notebook in the closed position.
Figure 3:
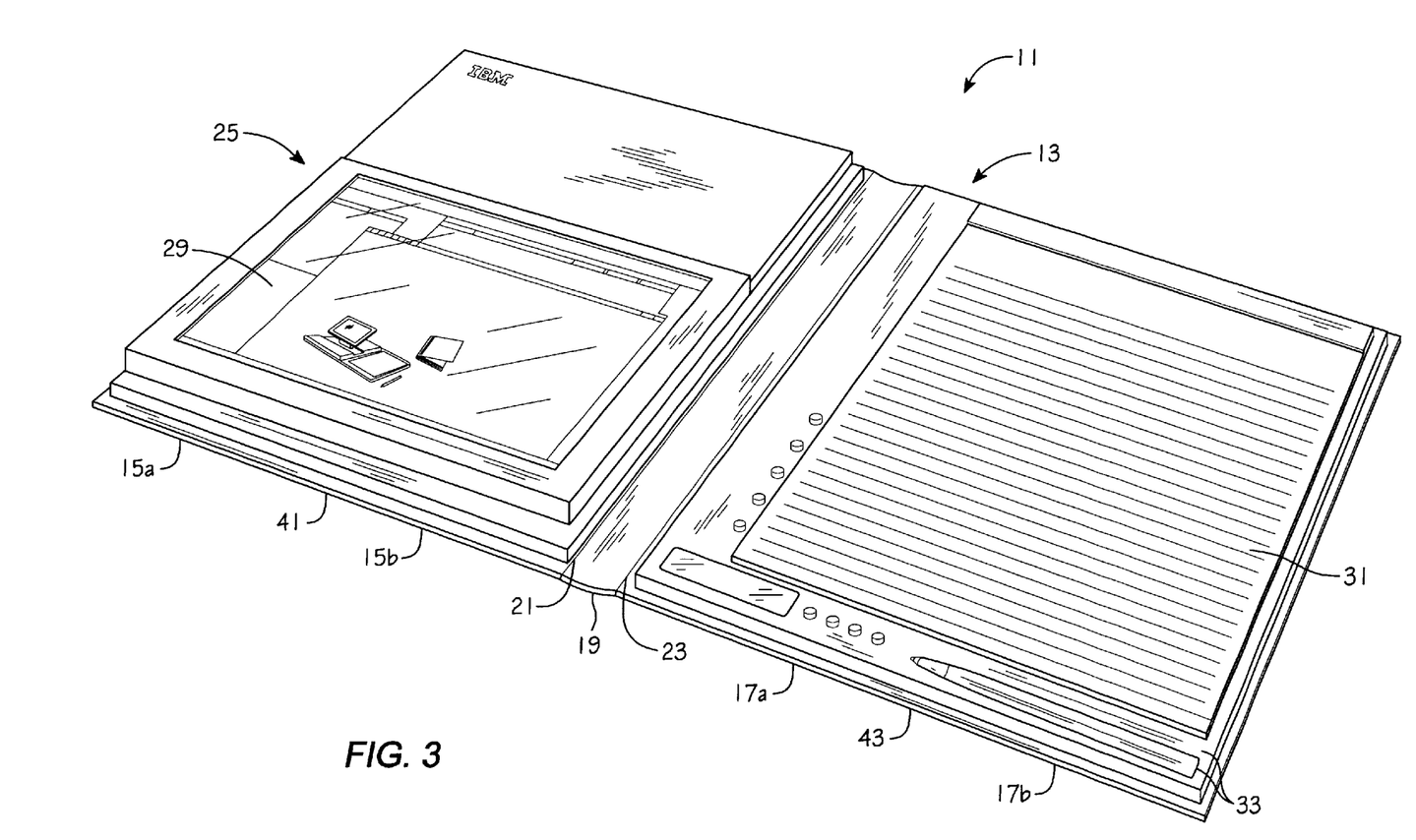
FIG. 3 is an isometric top view of the portfolio notebook computer of FIG. 1 with the notebook in the open position.

Referring to FIGS. 1 and 2, a portfolio computer notebook ("portfolio") 11 constructed in accordance with the invention is shown. Portfolio 11 has an outer cover 13 that is formed from a pair of flat, substantially congruent, hardback halves or portions 15, 17. Portions 15, 17 are joined by a flexible spine or hinge 19 along their adjacent side edges 21, 23, respectively, which act as fold lines. As shown in FIG. 3, a first component or notebook-type portfolio computer 25 is contained within cover 13. Computer 25 is mounted to the interior surface of left portion 15 and includes an integrated, low profile keyboard 27 with a movable display screen 29. A paper notepad 31 and digitizer 33 are mounted to the interior surface of right portion 17. In the preferred embodiment, digitizer 33 requires both a sensor plane behind notepad 31 and a special pen in order to capture and digitize the pen positions. In some embodiments, there may be electrical wires that pass through the cover, connecting the computer 25 with the digitizer 33. Many other types of components also may be substituted or mounted to portions 15, 17, without departing from the scope of the invention. Examples include a full-sized computer display on one portion, and other parts of the computer, a different display, or some other elements on the other portion.

When cover 13 is in the closed position (FIGS. 1 and 2), portfolio 11 has a generally flat rectangular shape or "footprint." In one embodiment, the footprint consumes an area measuring approximately 10×13 inches. Neither the portfolio computer 25 nor the notepad 31 are accessible when cover 13 is closed. Cover 13 is moved to the open position (FIG. 3) by pivoting one of the portions 15, 17, 180° relative to the other, thereby doubling the footprint of portfolio 11. In the open position, both the notepad 31 and computer 25 are accessible and the display screen 29 may be articulated to the upright position (FIG. 4) for easier viewing by the user.

As best illustrated in FIGS. 1 and 2, portfolio 11 is also provided with two additional hinges or fold lines 41, 43 (shown in phantom) that allow portfolio 11 to be handled more easily by the user. Fold line 41 substantially bisects the length of left portion 15 into two equal panels 15a, 15b, while fold line 43 substantially bisects the length of right portion 17 into two equal panels 17a, 17b. Each panel 15a, 15b, 17a, 17bis stiff and rigid to better support the components of portfolio 11. As will be explained in further detail below, each fold line 41, 43 allows its respective portion panels to be folded up to 180° relative to each other. Note that fold lines 41, 43 are substantially undetectable when their respective panels 15a, 15b, and 17a, 17bare left flat and coplanar.

Figure 5:
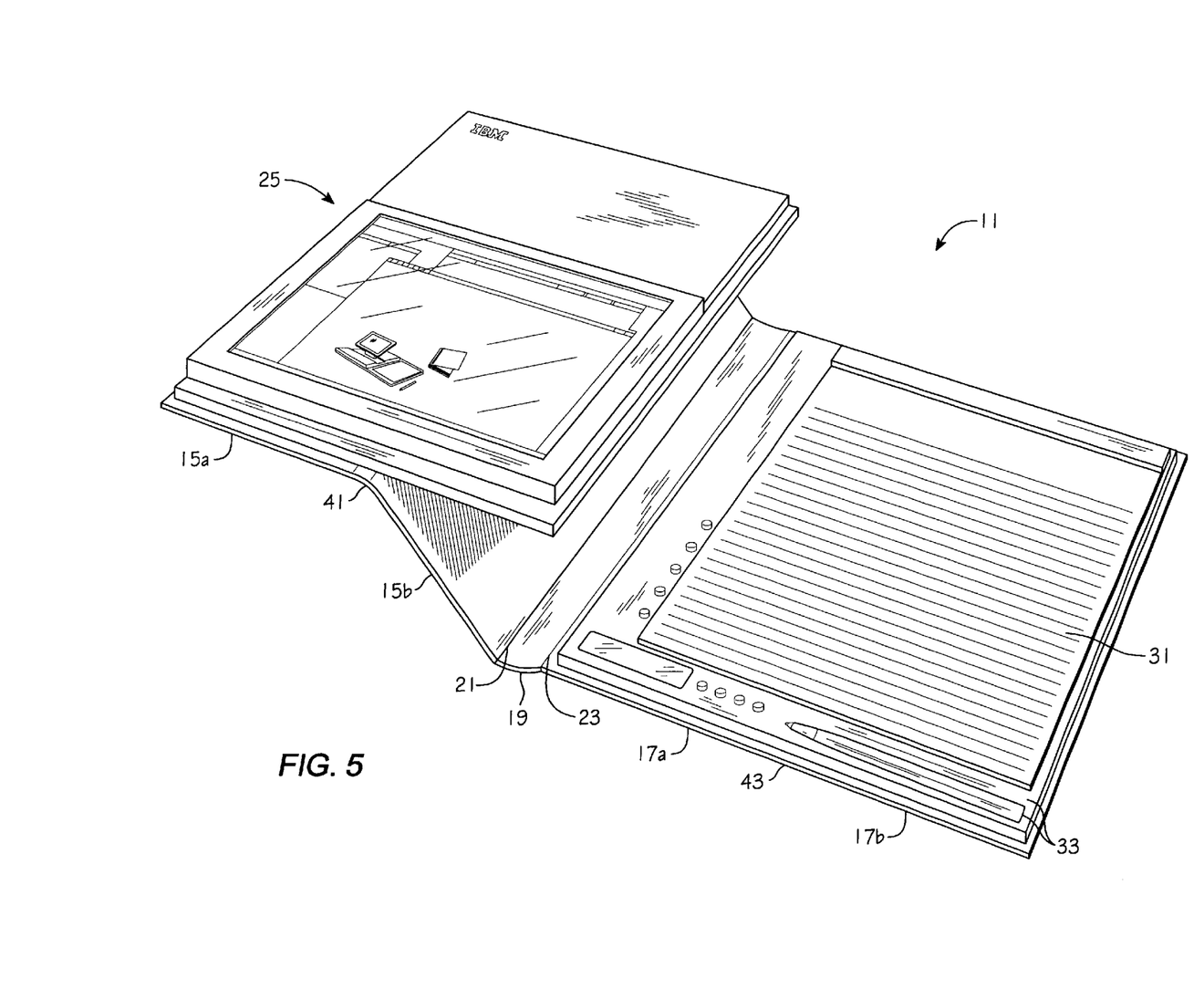
FIG. 5 is an isometric top view of the portfolio notebook computer of FIG. 1 with the computer portion of the notebook at an initial stage of deployment.

In operation, the footprint of portfolio 11 may be reduced to approximately one half of the area required by the fully open cover 13. The footprint is reducible regardless of which portion 15, 17 of portfolio 11 the user wishes to utilize. For example, to reduce the footprint and then use portfolio computer 25, portion 15 is rotated clockwise about fold line 21 and/or hinge 19 toward portion 17. However, instead of rotating the entire portion 15 in a single plane, the user bends portion 15 (FIG. 5) such that panel 15brotates clockwise relative to panel 15a about fold line 41. Preferably, panel 15a remains substantially parallel to portion 17 as panel 15b hinges at both fold line 41 and fold line 21. Note that computer 25 remains mounted to panel 15a at all times. Preferably, computer 25 is removably secured to both panels 15a, 15b with mechanical fastening devices (such as snaps, latches, or hook-and-loop fasteners), such that panel 15b readily detaches from computer 25 during the footprint reduction exercise.

Figure 6:
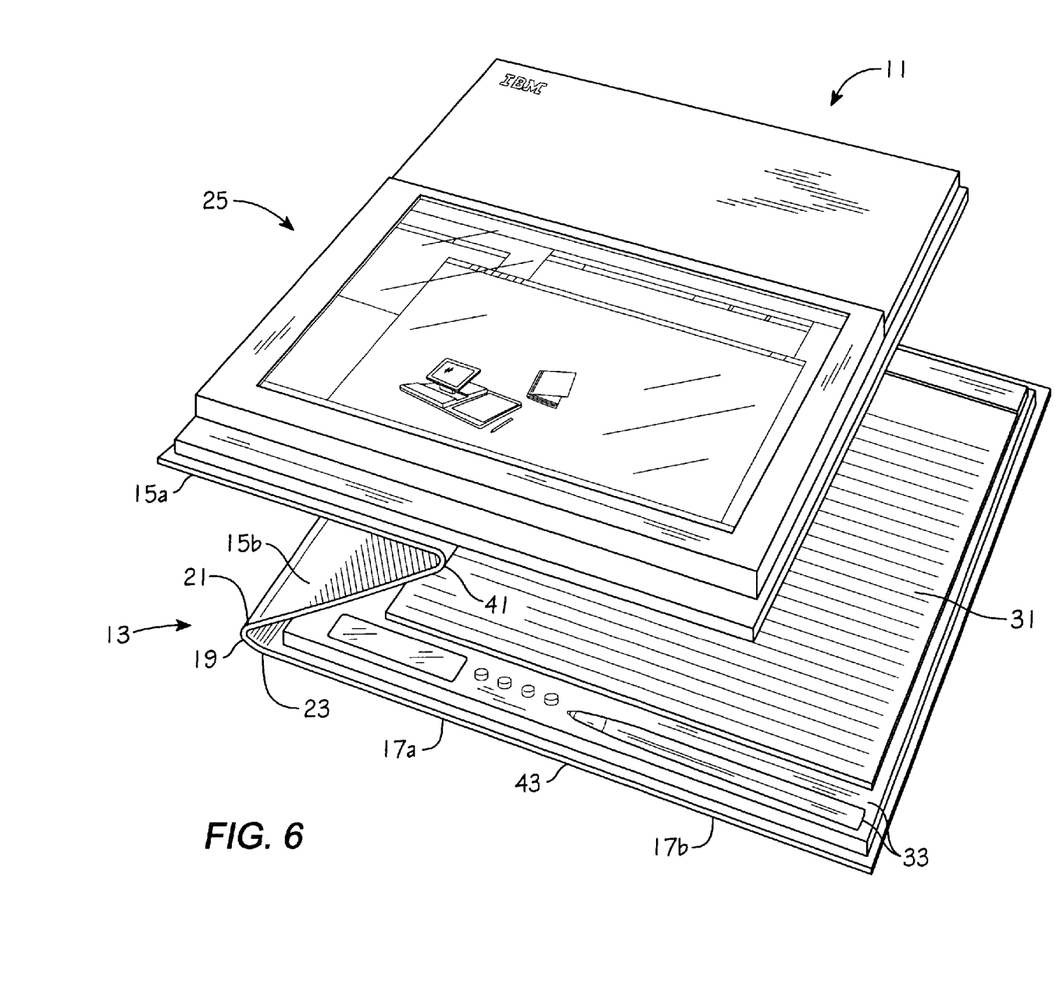
FIG. 6 is an isometric top view of the portfolio notebook computer of FIG. 1 with the computer portion of the notebook at an intermediate stage of deployment.
Figure 7:
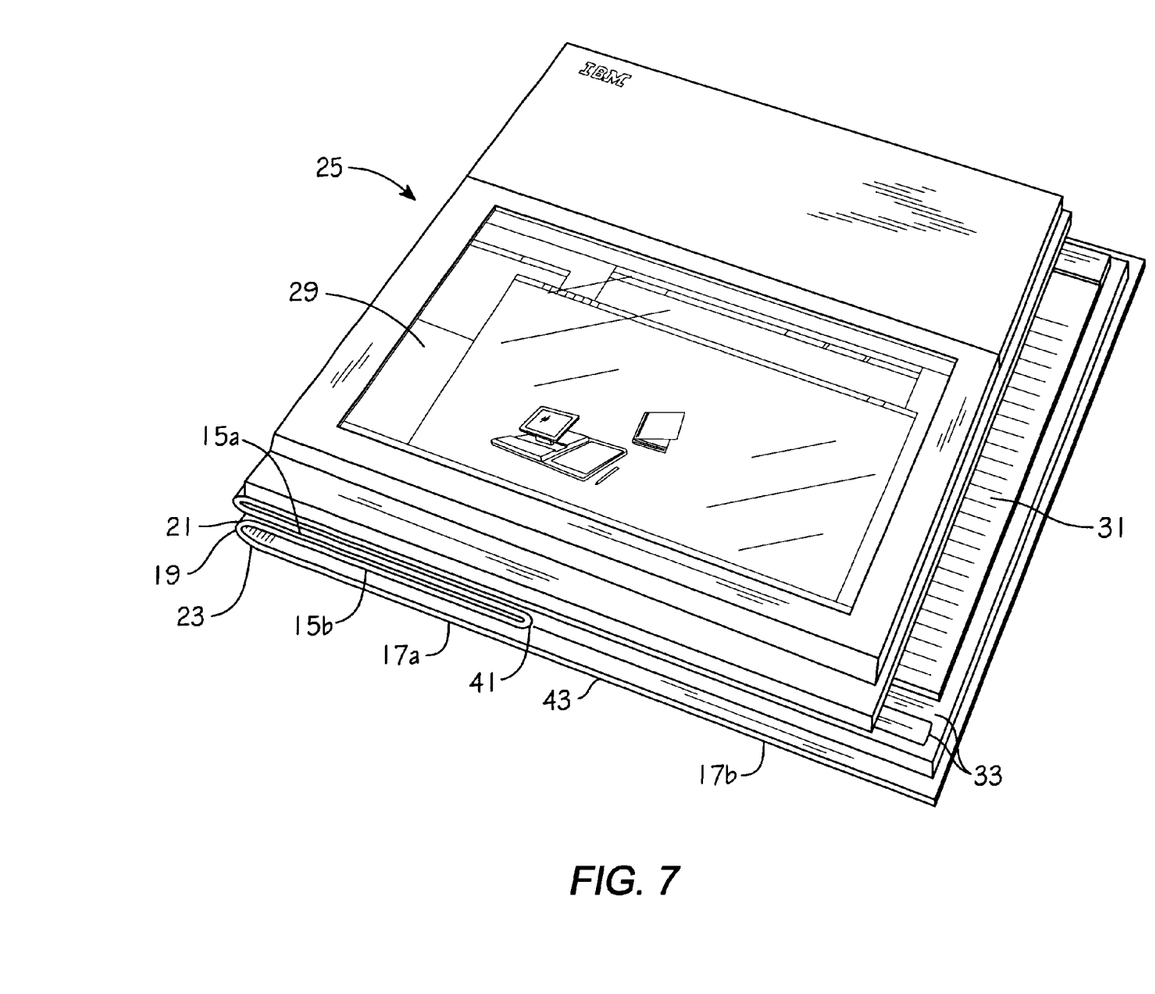
FIG. 7 is an isometric top view of the portfolio notebook computer of FIG. 1 with the computer portion of the notebook fully deployed.
Figure 8:
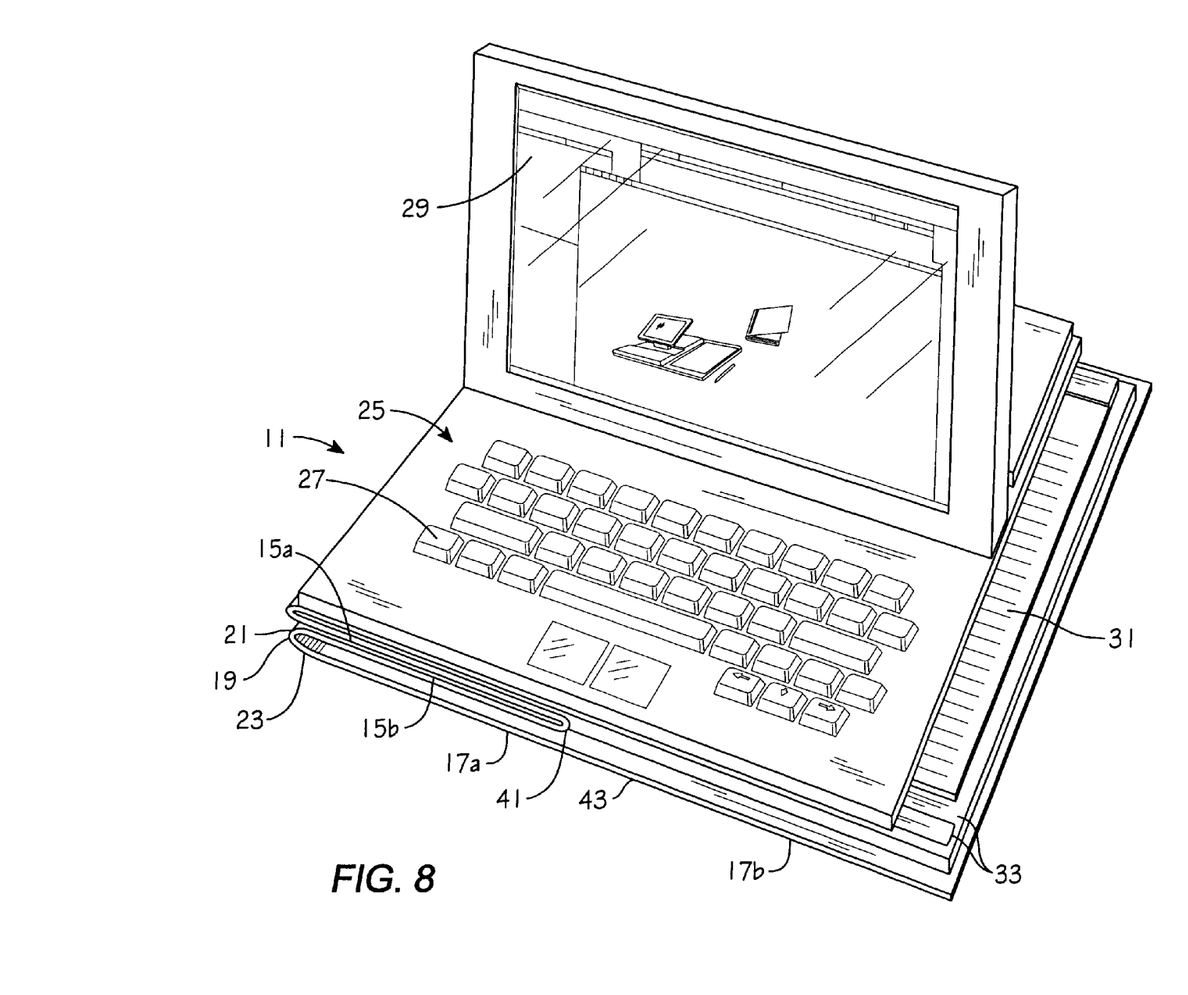
FIG. 8 is an isometric top view of the portfolio notebook computer of FIG. 1 with the computer portion of the notebook fully deployed and the display screen elevated.

As computer 25 is moved over the top of notepad 31 (FIG. 6), cover 13 forms a z-like shape when viewed from the end. Panel 15b continues to rotate clockwise with panel 15a and portion 17 in a substantially parallel relationship. As shown in FIG. 7, the footprint reduction is complete when computer 25 sits on top of notepad 31 and panels 15a, 15b and portion 17 are parallel. The user then pivots display screen 29 to its upright position (FIG. 8) to expose keyboard 27 and use portfolio computer 25. In this position, computer 25 is substantially free of overhang of portion 17.

Thus, when portfolio 11 is in the open position, portions 15, 17 are substantially coplanar. When portfolio 11 is in the closed position, portion 15 is substantially parallel to portion 17, and panels 15a, 15b are substantially coplanar. Finally, when portfolio 11 is in a reduced position, each panel 15a, 15b, and portion 17 are substantially parallel to each other in three separate planes.

Figure 9:
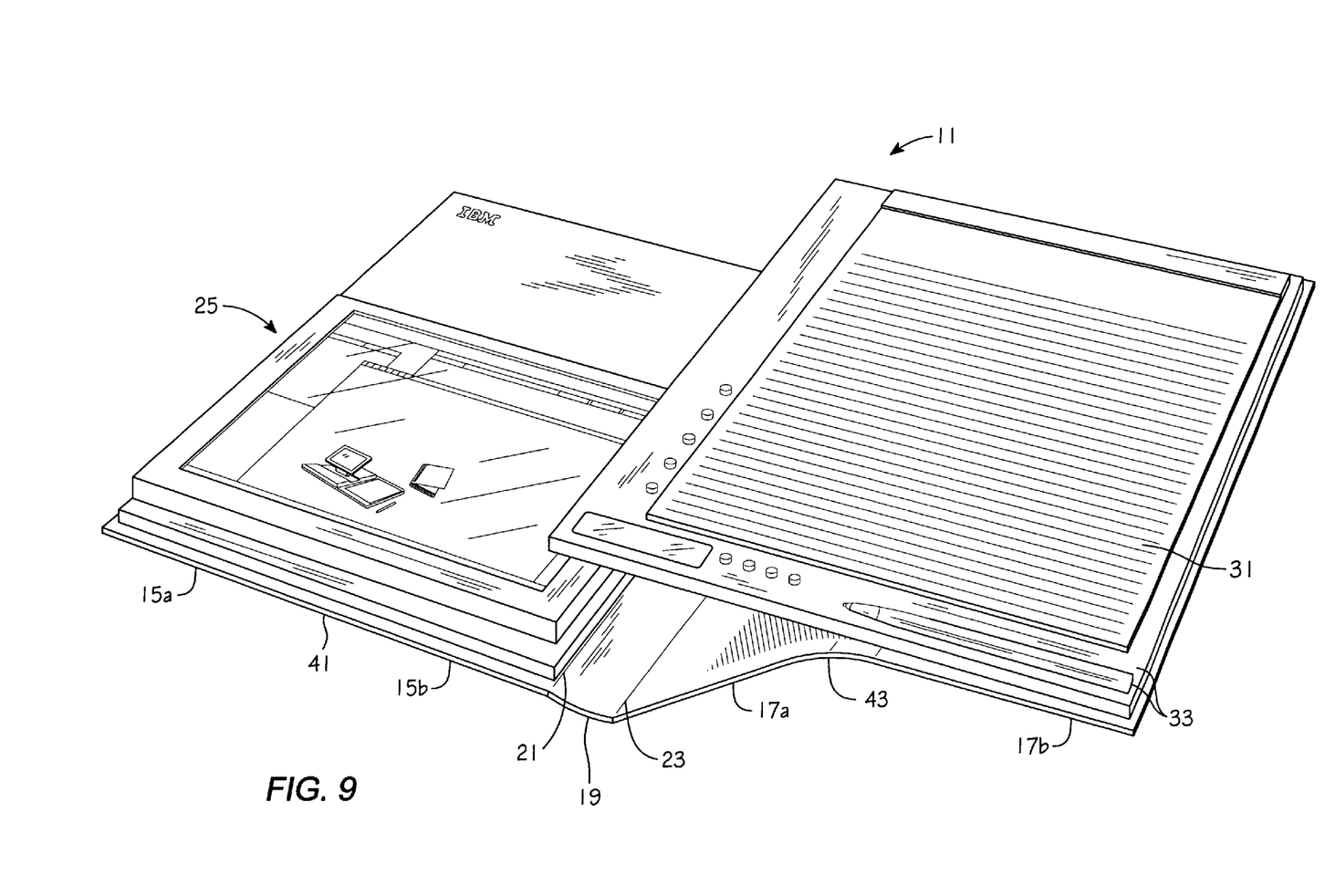
FIG. 9 is an isometric top view of the portfolio notebook computer of FIG. 1 with the notepad portion of the notebook at an initial stage of deployment.

Alternatively, the user may reduce the footprint of portfolio 11 for exclusive use of notepad 31 and/or digitizer 33 by completing the following steps. First, portion 17 is rotated counterclockwise about fold line 23 and/or hinge 19 toward portion 15 (FIG. 9). The user bends portion 17 such that panel 17a rotates counterclockwise relative to panel 17b about fold line 43. Preferably, panel 17b remains substantially parallel to portion 15 as panel 17a hinges at both fold line 43 and fold line 23. Note that notepad 31 remains mounted to panel 17b at all times. Preferably, notepad 31 is removably secured to both panels 17a, 17b with mechanical fastening devices (such as snaps, latches, or hook-and-loop fasteners), such that panel 17a readily detaches from notepad 31 during the footprint reduction exercise.

Figure 10:
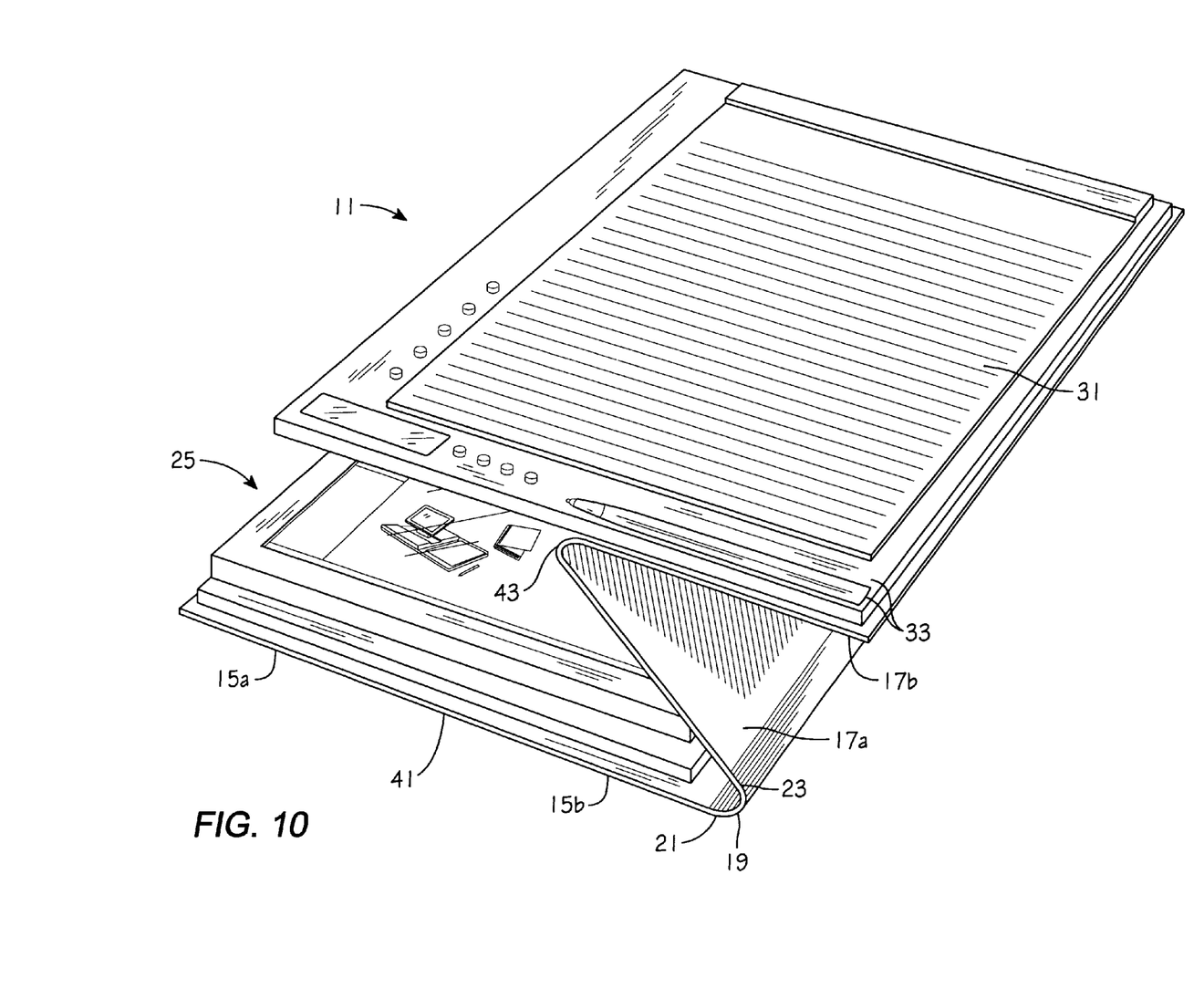
FIG. 10 is an isometric top view of the portfolio notebook computer of FIG. 1 with the notepad portion of the notebook at an intermediate stage of deployment.
Figure 11:
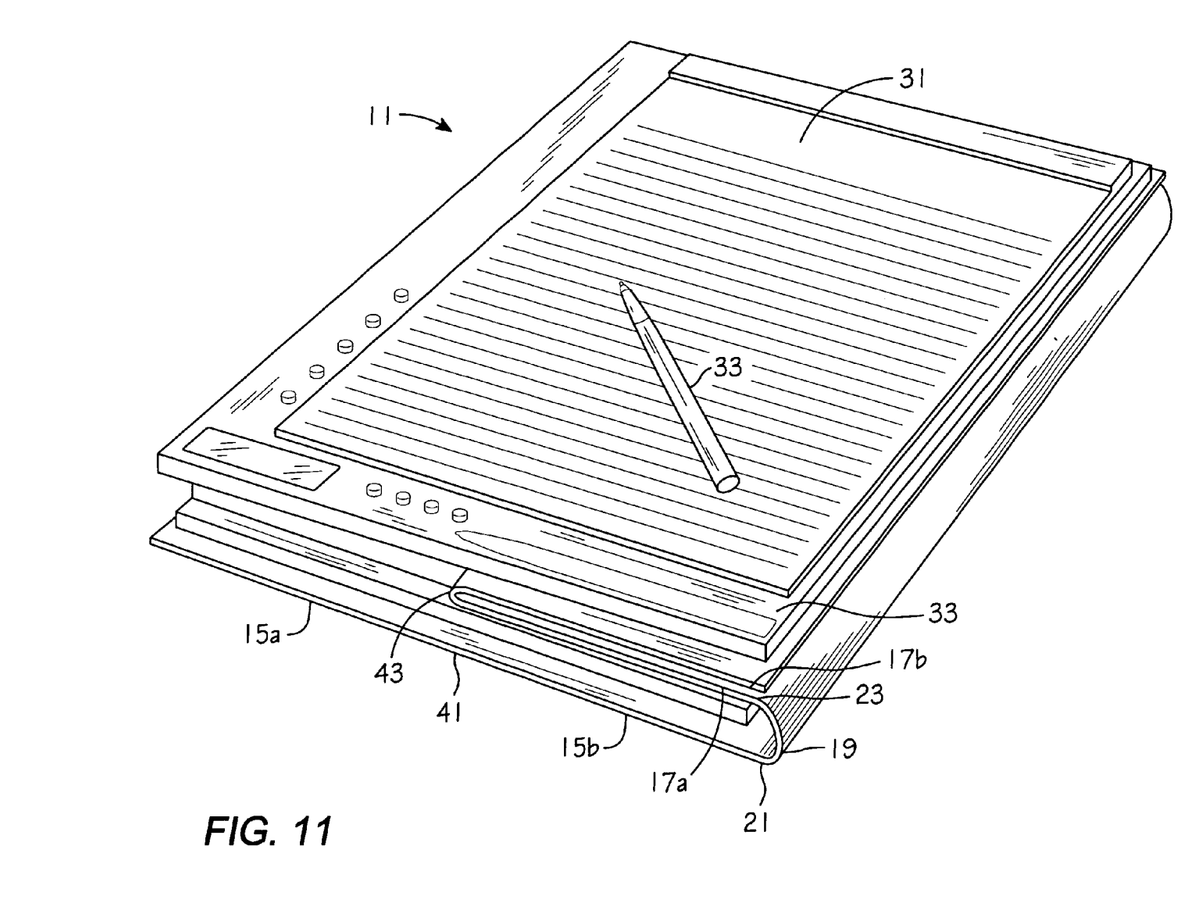
FIG. 11 is an isometric top view of the portfolio notebook computer of FIG. 1 with the notepad portion of the notebook fully deployed.

As notepad 31 is moved over the top of computer 25 (FIG. 10), cover 13 forms a z-like shape when viewed from the end. Panel 17a continues to rotate counterclockwise with panel 17b and portion 15 in a substantially parallel relationship. As shown in FIG. 11, the footprint reduction is complete when notepad 31 sits on top of computer 25 and panels 17a, 17b and portion 15 are parallel. In this position, computer 25 is substantially free of overhang of portion 15.

The present invention has several advantages. The folding cover allows the user of the portfolio computer to reduce the size or footprint of the portfolio to approximately one half of the fully open size without having to face one of the inside surfaces outward or downward. This capability allows the portfolio to keep substantially the same size footprint whether it is open or closed. When the portfolio is opened in this manner; the side or portion that is not being used is protected and not facing down or exposed as it would be in a conventional portfolio that merely folds in half. Such a configuration protects the display screen and notepad records from damage. Moreover, the unique folded configuration of the present invention is easier to perform. With more natural movements, the portfolio computer of the present invention can be made smaller more easily while standing. This is an important feature for using the computer or note taking in a mobile situation. It is also easier to perform in restricted spaces such as an airplane seat.

While the invention has been shown or described in only some of its forms, it should be apparent to those skilled in the art that it is not so limited, but is susceptible to various changes without departing from the scope of the invention.

What is claimed is:

1. A portfolio notebook, comprising:
   a first cover having first and second panels that are hinged together at a fold line, wherein the first and second panels are substantially congruent;
   a second cover;
   a hinge joining the second panel of the first cover and the second cover;
   a first component mounted to the first panel of the first cover;
   a second component mounted to the second cover; and wherein
   the portfolio notebook has an open position wherein the first and second covers are substantially coplanar, a closed position wherein the first cover is substantially parallel to the second cover, and the first and second panels of the first cover are substantially coplanar, and a reduced position wherein each of the first and second panels and the second cover are substantially parallel to each other in three separate planes.

2. The portfolio notebook of claim 1 wherein the first and second covers are substantially congruent.

3. A portfolio notebook, comprising:
   a first cover having first and second panels that are hinged together at a fold line;
   a second cover;
   a hinge joining the second panel of the first cover and the second cover;
   a first component mounted to the first panel of the first cover;
   a second component mounted to the second cover; wherein
   the portfolio notebook has an open position wherein the first and second covers are substantially coplanar, a closed position wherein the first cover is substantially parallel to the second cover, and the first and second panels of the first cover are substantially coplanar, and a reduced position wherein each of the first and second panels and the second cover are substantially parallel to each other in three separate planes; and wherein
   the first component is a portfolio computer and the second component is a notepad.

4. The portfolio notebook of claim 1 wherein the first and second panels of the first cover and the second cover are hardback.

5. A portfolio notebook, comprising:
   a first cover having first and second panels that are hinged together at a fold line;
   a second cover;
   a hinge joining the second panel of the first cover and the second cover;
   a first component mounted to the first panel of the first cover;
   a second component mounted to the second cover; wherein
   the portfolio notebook has an open position wherein the first and second covers are substantially coplanar, a closed position wherein the first cover is substantially parallel to the second cover, and the first and second panels of the first cover are substantially coplanar, and a reduced position wherein each of the first and second panels and the second cover are substantially parallel to each other in three separate planes; and wherein
   both components are accessible in the open position, neither component is accessible in the closed position, and only the first component is accessible in the reduced position.

6. A portfolio notebook, comprising:
   a first cover having first and second panels that are hinged together at a fold line;
   a second cover;
   a hinge joining the second panel of the first cover and the second cover;
   a first component mounted to the first panel of the first cover;
   a second component mounted to the second cover; wherein
   the portfolio notebook has an open position wherein the first and second covers are substantially coplanar, a closed position wherein the first cover is substantially parallel to the second cover, and the first and second panels of the first cover are substantially coplanar, and a reduced position wherein each of the first and second panels and the second cover are substantially parallel to each other in three separate planes; and wherein
   the second cover has two panels that are hinged together by a second fold line and the second component is mounted to only one of the panels of the second cover.

7. A portfolio computer notebook, comprising:
   a first cover having first and second panels that are hinged together at a first fold line;
   a second cover having third and fourth panels that are hinged together at a second fold line;
   a spine joining the second panel of the first cover and the third panel of the second cover;
   a portfolio computer mounted to the first panel of the first cover;
   a component mounted to the fourth panel of the second cover; and wherein
   the portfolio computer notebook has an open position wherein the first and second covers are substantially coplanar such that both the portfolio computer and the component are accessible, a closed position wherein the first cover is substantially parallel to the second cover such that the portfolio computer and the component are inaccessible, a first reduced position wherein each of the first and second panels and the second cover are substantially parallel to each other in three separate planes such that only the portfolio computer is accessible, and a second reduced position wherein each of the third and fourth panels and the first cover are substantially parallel to each other in three separate planes such that only the component is accessible.

8. The portfolio computer notebook of claim 7 wherein the first and second covers are substantially congruent.

9. The portfolio computer notebook of claim 7 wherein each of the panels is substantially congruent.

10. The portfolio computer notebook of claim 7 wherein each of the panels is hardback.

11. A portfolio computer notebook, comprising:
- a hardback computer cover having a computer crease that divides the computer cover into a computer outer panel and a computer inner panel;
- a hardback notepad cover having a notepad crease that divides the notepad cover into a notepad outer panel and a notepad inner panel;
- a spine joining the computer inner panel and the notepad inner panel;
- a portfolio computer mounted to the computer outer panel;
- a notepad mounted to the notepad outer panel; wherein
- when the notepad cover is supported, the computer cover may be folded along the computer crease and the spine such that the computer lies on top of the notepad and is substantially free of overhang of the notepad cover; and wherein
- when the computer cover is supported, the notepad cover may be folded along the notepad crease and the spine such that the notepad lies on top of the portfolio computer and is substantially free of overhang of the computer cover.

12. The portfolio computer notebook of claim 11 wherein the covers are substantially congruent.

13. The portfolio computer notebook of claim 11 wherein each of the panels is substantially congruent.

14. A method for reducing the footprint of a portfolio computer notebook, comprising the steps of:
- (a) providing a portfolio having two covers joined by a spine, a crease in one of the covers, and a portfolio computer mounted to said one of the covers;
- (b) opening the portfolio such that the portfolio computer is exposed;
- (c) pivoting said one of the covers along the spine relative to the other cover and folding said one of the covers along the crease; and
- (d) placing the portfolio computer on top of said other cover such that said one of the covers is folded therebetween, and wherein the portfolio computer and said one of the covers are substantially free of overhang of said other cover.

15. A method for reducing the footprint of a portfolio notebook, comprising the steps of:
- (a) providing a portfolio having first and second covers with first and second components, respectively, the covers being joined by a spine and each of the covers having a crease;
- (b) opening the portfolio such that both components are exposed;
- (c) pivoting one of the covers along the spine relative to the other of the covers and folding said one of the covers along its crease; and
- (d) placing the component of said one of the covers on top of the component of said other of the covers such that said one of the covers is folded therebetween, and wherein said component of said one of the covers and said one of the covers are substantially free of overhang of said other of the covers.

* * * * *